United States Patent Office 2,800,820
Patented July 30, 1957

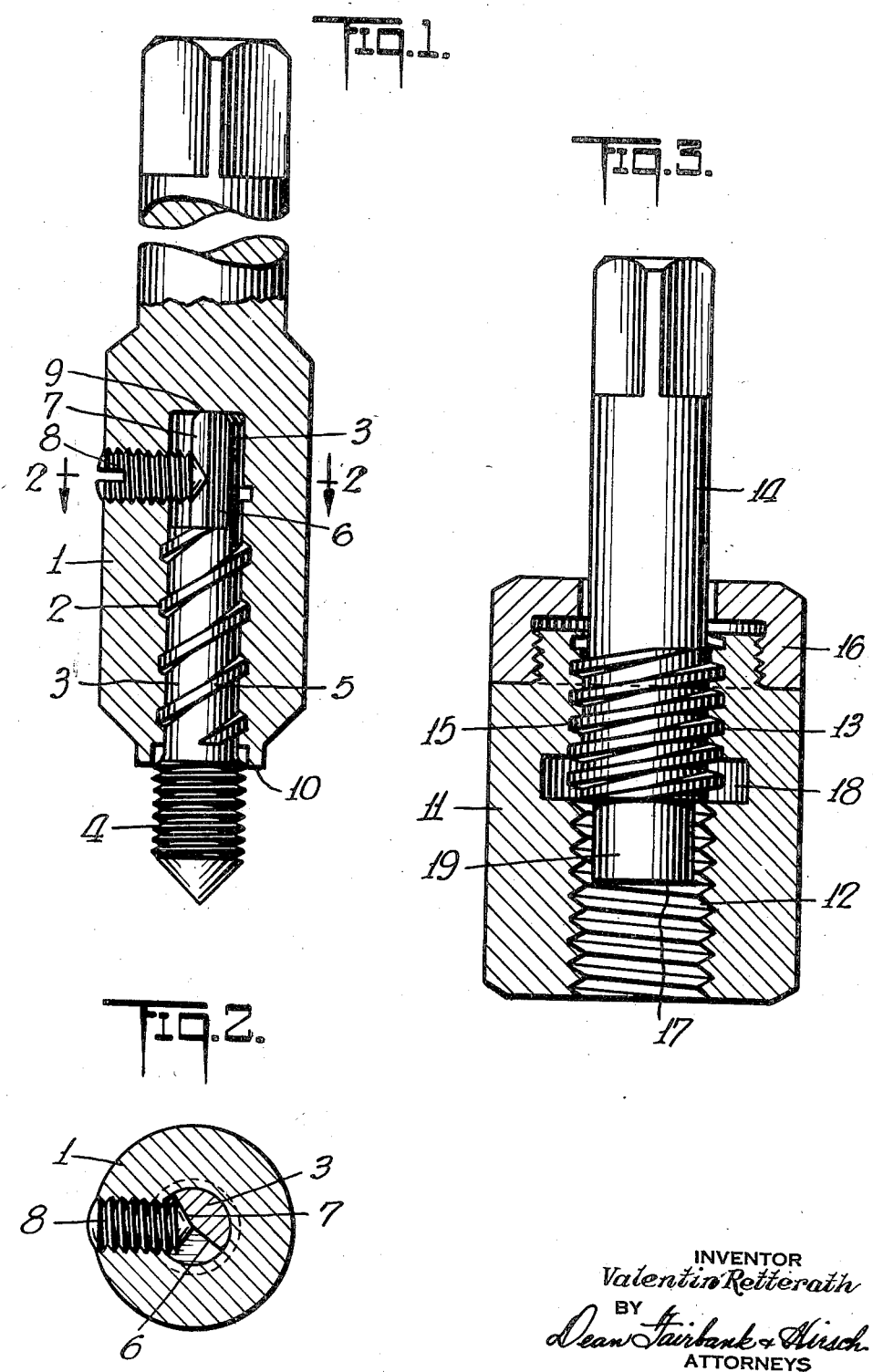

2,800,820

DRIVER TOOL FOR SELF TAPPING INSERTS, STUDS, SCREW BOLTS, AND THE LIKE

Valentin Retterath, Iversheim uber Euskirchen, Bezirk Koln, Germany, assignor to Groov-Pin Corporation, a corporation of New York Application June 4, 1954, Serial No. 434,627

8 Claims. (Cl. 81—53)

The invention is concerned with driver tools which serve for introduction into corresponding bores of machines or structures, of inserts, such as threaded bushings with outer and inner threads, and screw bolts with outer threads only, and similar elements.

Such insert tools may consist of two parts, i. e., a screw piece and a grip piece, threadedly connected together. The screw piece serves to hold the insert or the like; the grip piece has an end conformation that serves for application of torque as for instance by means of a tap wrench or the like. Various embodiments of grip piece are per se known.

A disadvantage frequently observed and which is extremely objectionable in the case of such driver tools is that the tool abuts in such manner against the insert or the like when installed, and exerts so pronounced a lock nut action that upon movement of the tool in reverse direction for removal from the insert or the like, release of the tool from the insert will not result. The tool thus remains tightly connected with the insert or the like, which in the reverse movement of the tool from the machine or structure piece therefore is screwed out instead of remaining securely installed as it should be, so that the operation of the tool is completely undone or frustrated.

The following is a description of the invention:

In the process of screwing in, there should be no such drawing together of the insert tool and the insert to be introduced, as would necessitate a turning moment for release of the insert driving tool with respect to the insert when installed, that is equal to or greater than the friction moment exerted between the insert or the like and the structure in which it is mounted. This friction moment occurs preferably by the friction in the thread, and indeed between the outer thread of the insert or the like and the inner thread of the structure in which it is installed. The insert is self-tapping and thus itself cuts such inner thread, whereas for studs and the like, the inner thread is pre-tapped in the structure in which the stud is to be installed. Since the magnitude of the insert tool releasing turning moment is essentially determined by the threaded connection between the screw piece and the grip piece of the tool, the invention teaches that this connection shall be so contrived or selected that an easy release, that is a release under application of a relatively slight turning movement becomes possible of the entire reversely turning tool with respect to the insert threaded into the structure. To this end, the grip piece must first become released from the screw piece, that is the pressure therebetween must be discontinued and thereupon the screw piece must be turned out lightly with respect to the insert or the like.

According to the invention, this is accomplished in that for screwing in and screwing out of the screw piece with respect to an insert, a stud or the like, a standard thread form is used, but for connection of the screw piece with the grip piece, a single or multiple steep thread is utilized, preferably of pitch which is several times as great as the pitch of the thread of the insert or like element to be installed. Moreover arrangements may be provided between the screw piece and the grip piece at the steep pitch thread, which serve to limit the turning movement of the grip piece with respect to the screw piece. Such limiting means could for instance be a stop in the grip piece of the insert applying tool, illustratively in the form of a cylindrically pointed set screw which is preferably hardened to coact with stop surfaces of the screw piece disposed at suitable angles, in such manner that the abutment of the set screw point with respect to one of the stop surfaces at all times determines a limit of relative movement as between the stop surfaces.

According to the invention, the action of the steep thread should be as free as possible, which is attainable by good workmanship. Preferably an accurately machined hardened steep thread is used. Such steep thread could under certain circumstances be replaced by means of a known thread construction which operates with suitably set and arranged balls in the thread ways. It is important in each case that the friction moment of the inserted element, for instance of the insert, remains greater under all circumstances than the turning moment exerted in the release and reverse turning and removal of the tool. The thread which constitutes the temporary connection between the screw piece and the insert element to be applied should in order to effect release therefore have no equal or greater, but on the contrary, a smaller turning moment than the friction moment of the insert element screwed into the structure.

One of the features of the invention is the unitary construction of the grip piece which has means to limit its movement relative to the screw piece as distinguished from arrangements in which the grip piece is itself composed of elements movable relative to each other in the normal use of the tool.

Two embodiments of the invention are shown in the drawings; in which

Fig. 1 is a side elevation partly in axial section of a tool for inserts according to the invention, Fig. 2 is a section along line II—II of Fig. 1, and Fig. 3 is a side elevation partly in axial section of an inserting tool for studs and the like according to the invention.

The tool of the embodiment of Figs. 1 and 2 consists of two tool members, viz. a screw piece and a grip piece. The grip piece, illustratively a casing 1, has at its upper end a shank that has a square conformation at its extremity. The square conformation serves for application of torque applying means such as a tap wrench or the like to serve for application by hand. The shank may be mounted in the chuck or collet of a drill press, tapping machine or the like if the application is to be effected mechanically.

The casing 1 has a multiple steep inner thread 2, into which the screw piece, in this case the threaded rod 3, is screwed. The threaded rod 3 carries at its lower protruding end a standard thread 4 which serves for screwing on of an insert or the like. At its upper part the threaded shaft 3 has a multiple steep pitch thread 5 which is screwed into the corresponding steep tap thread 2 of the casing 1. The steep winding 2, 5 has an accurately formed pitch, preferably in the order of six times the pitch of the standard thread 4.

Moreover the threaded rod 3 has at its upper end a milled section or the like with two desirably radial stop surfaces 6 and 7 shown at an obtuse angle relative to each other. In the casing 1 there is lodged a hardened set screw 8 which has a conical point that is lodged against either surface 6 or surface 7, to limit relative movement between the casing 1 and rod 3, preferably to a range exceeding 180 degrees and desirably substantially less than 360 degrees. During the driving action the point of the set screw 8 will be lodged against the surface 6, whereby a limit to the turning movement of the threaded rod 3 with respect to the casing 1 is effected.

In operation of the tool shown in Figs. 1 and 2, after a threaded element—for instance an insert or the like—has been screwed onto standard thread 4 of rod 3 until it contacts end surface 10, the tool is turned clockwise (as viewed from the top of Fig. 1), thereby to thread the insert into a corresponding bore of a structure. As a result of the resistance to threading in, the threaded rod 3 will screw into the steep thread 2 of the casing 1, preferably to such extent that its top finally engages the end wall 9 at such time as the stop surface 7 is engaged by the conical point of the set screw 8. At the moment of the requisite turning of the tool in reverse direction for the release from the insert or the like, the casing 1 will first become screwed upwardly along the steep thread 2, 5, until the stop surface 6 comes into engagement with the conical point of the set screw 8. This relatively short turning angle suffices, completely to release the lower end surface 10 of the casing with respect to the end of the insert (not shown) so that the standard thread 4 can easily be screwed out from the insert or the like that has been installed in the structure without the slightest tendency to loosen the insert.

Fig. 3 shows another embodiment, a tool which likewise operates according to the principle of the invention, but is so constituted that it is suitable for introduction of studs or the like.

The tool consists in this case also of a screw piece, namely, a casing 11 which has a standard thread 12 tapped axially into its lower part and at its upper part a multiple steep pitch thread 13. Moreover the tool includes a grip piece, namely, a shank 14. At its lower part, the shank carries the steep thread 15 with a lower axial extension 19 of reduced diameter. At its upper end the shank has a square conformation for application of a tap wrench. Nut 16 about the upper end of thread 15, serves as a stop for the screw movement upward and as security against unthreading of the shank 14 out of the casing 11. Between the threads 12 and 13, there is a recess or under-cut 18 in casing 11.

The operation of the tool shown in Fig. 3 is as follows:

The tool is mounted by way of example into a drill press with a tapping head and—when viewed downwardly in Fig. 3—moves clockwise. After the stud to be introduced has been screwed into the thread 12, it is threaded into the tapped bore of the machine or structure in which the stud is to be installed. During the operation of screwing in, the driving end surface 17 of lug 19 on shank 14 is pressed tightly against the upper surface of the stud by means of the steep thread 15 and will be lifted from the stud at the moment of turning the tool in reverse direction for removal from the stud. The axial stress will thereby be immediately discontinued and the thread 12 admits of very easy unscrewing with respect to the corresponding outer length of thread of the stud screwed into the machine or structure in which it has been installed.

The invention may be applied also in accordance with its spirit to the insertion of screws, wood screws or the like, in material that has not been pre-bored, or in bored holes not provided with threads.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. A quick release driver tool for the application of a threaded member, comprising coacting tool members consisting of a screw piece and a unitary grip piece coaxial therewith, the latter having a torque applying conformation at its outer end, the screw piece having a coaxial standard thread conformation at its forward end for mounting the threaded member to be installed, said coacting tool members having a threaded connection therebetween of a pitch much steeper than the standard thread conformation, means at the forward end of the grip piece for engagement with the adjacent end of the threaded member to be installed, and stop means on one of said coacting tool members operative for limiting the reverse turning movement of one of them relative to the other, thereby first to back the forward end of the grip piece away from the installed threaded member in the turning of the driver tool in the reverse direction for release thereof from the installed threaded member.

2. The combination recited in claim 1 in which the threaded connection of steep pitch between the coacting tool members is a multiple thread of a pitch in the order of six times the standard pitch.

3. The combination recited in claim 1 in which the standard threaded conformation at the forward end of the screw piece protrudes from the grip piece and is externally threaded at said protruding end for mounting a threaded insert sleeve which when thus mounted abuts the end of the grip piece.

4. The combination recited in claim 1 in which the standard threaded conformation is a tapped bore in the advance end of the screw piece which serves for mounting a screw stud to be affixed and in which the grip piece is threaded into the screw piece and has an inner extremity to abut the adjacent end of the stud to be installed.

5. The combination recited in claim 1 in which the threaded connection of steep pitch between the coacting tool members is a multiple thread of a pitch in the order of several times the standard pitch and in which the stop means on one of the tool members is a piece threaded thereon which serves to arrest the reverse turning movement of the other member relative thereto.

6. The combination recited in claim 1 in which the screw piece is a rod with a steep thread axially positioned in the grip piece, the stop means is a set screw having a conical end mounted radially of the grip piece near the inner end thereof and beyond the thread of the screw piece and in which said screw piece has a pair of stop conformations to engage said conical end of the set screw to determine the limits of relative movement between the screw piece and the grip piece.

7. The combination recited in claim 6 in which the stop conformations extend radially of the screw piece and are at a relative angle greater than 180° and less than 360°.

8. The combination recited in claim 1 in which the grip piece has a threaded forward portion disposed in a corresponding threaded portion of the screw piece which is in the form of a shell, and in which a nut mounted upon the upper end of the screw piece shell and encompassing the grip piece limits the reverse rotary motion of the grip piece relative to the screw piece and in which the inner extremity of the grip piece has an abutment surface for engaging the adjacent end of a stud to be installed.

References Cited in the file of this patent

UNITED STATES PATENTS

| | | |
|---|---|---|
| 1,298,324 | Funk | Mar. 25, 1919 |
| 1,438,269 | Sehrt | Dec. 12, 1922 |
| 1,754,736 | Bryant | Apr. 15, 1930 |
| 2,013,923 | Naccarato | Sept. 10, 1935 |
| 2,458,622 | Miller | Jan. 11, 1949 |
| 2,622,466 | Vanden Bos et al. | Dec. 23, 1952 |

FOREIGN PATENTS

| | | |
|---|---|---|
| 125,298 | Great Britain | Apr. 17, 1919 |